July 24, 1962　　W. J. STEIN ET AL　　3,045,479
TORQUE METER
Filed April 3, 1959　　3 Sheets-Sheet 2

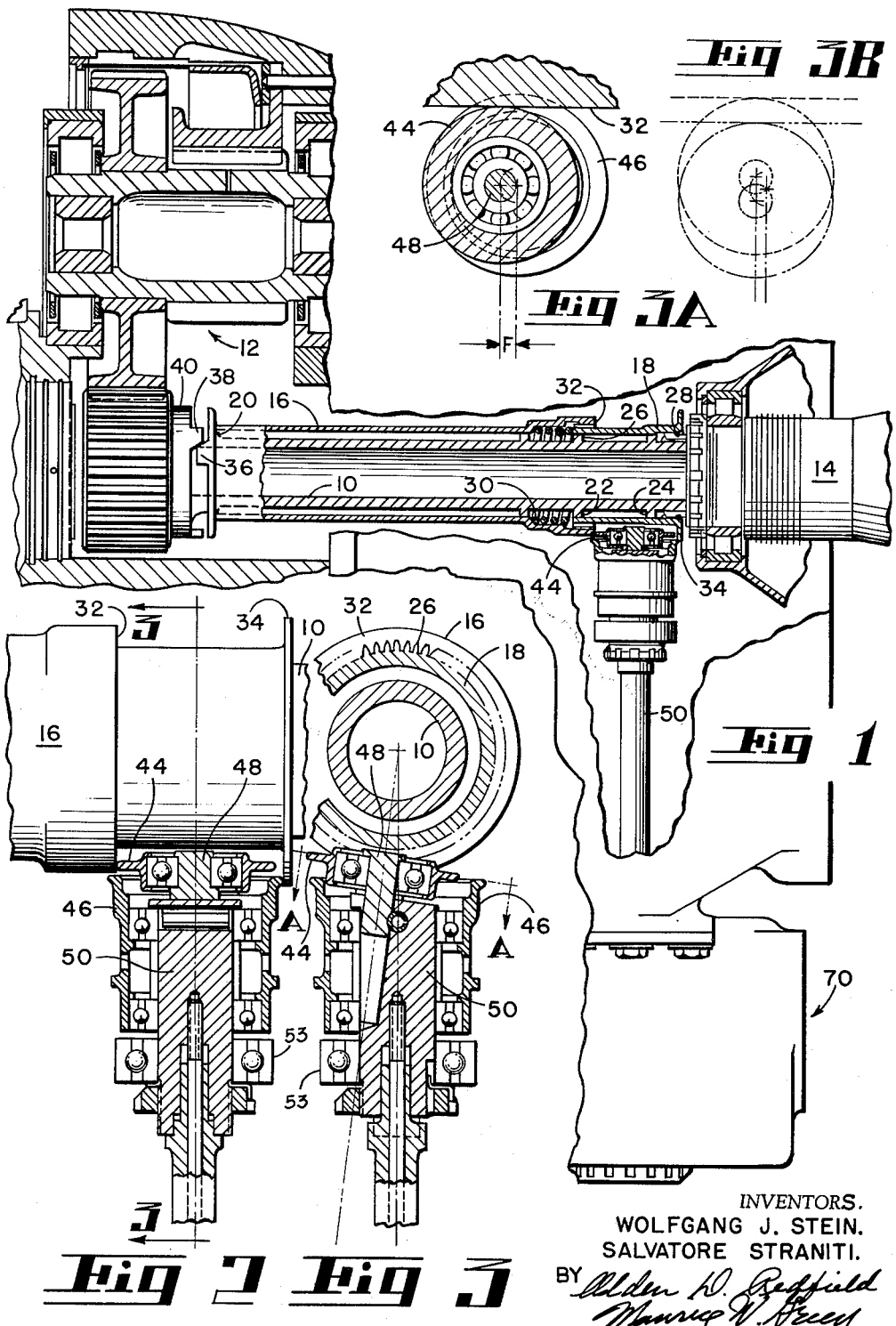

INVENTORS.
WOLFGANG J. STEIN.
SALVATORE STRANITI.
BY
ATTORNEYS.

July 24, 1962 W. J. STEIN ET AL 3,045,479
TORQUE METER
Filed April 3, 1959 3 Sheets-Sheet 3

INVENTORS.
WOLFGANG J. STEIN,
SALVATORE STRANITI.
BY
ATTORNEYS.

United States Patent Office 3,045,479
Patented July 24, 1962

3,045,479
TORQUE METER
Wolfgang J. Stein and Salvatore Straniti, Milford, Conn., assignors to Avco Manufacturing Corporation, Lycoming Division, Stratford, Conn., a corporation of Delaware
Filed Apr. 3, 1959, Ser. No. 803,929
3 Claims. (Cl. 73—136)

This invention relates to torque meters, particularly of the type of such device which is adaptable for indicating foot-pounds torque which with a r.p.m. reading will make available a determination of horse power output on prime movers in actual operation, such as aircraft engines under actual flight conditions.

The provision of an instrument and mechanism to actuate it which will indicate the torque output of an engine to determine engine performance under operating conditions is important in certain installations. However, as is always the case in any added instrument requirement, and particularly on aircraft, the necessity to eliminate as much as possible the excess of mechanism and complication thereof, both from the standpoint of weight which may be added and added maintenance cost and other factors, makes it important that the mechanism be simplified and add a minimum of parts to the already complicated mechanical devices necessarily included in a power plant.

It is therefore an important object of this invention to provide a torque indicating device capable of incorporation on an engine with a minimum of added parts, and specifically avoiding the addition of heavy load carrying members by using as a part of the mechanism for this device a torsionally deflected load transmitting member of the power plant itself.

It is a further object of this invention to provide a torque meter which measures torque as a function of the torsional deflection of a power transmitting member, such as a rotating power shaft of the engine, and to measure this deflection by means of mechanism which transfers the deflection with a proportional movement to a point outside the engine housing where it may be transmitted by conventional means to indicating instruments.

The above and other objects of the invention will appear more fully from the following detailed description and by reference to the accompanying drawings forming a part hereof, and wherein:

FIGURE 1 is a cross-section of the forward portion of an engine, including a section of the power-transmitting shaft, the torsional deflection of which is used as an indicator of torque. The cross-section also shows the general view of the mechanism for transmitting a measurement of the magnitude of the torsional deflection to the outside of the engine.

FIGURE 2 is a cross-section of the inner portion of the shaft and transmitting connections for translating the axial movement of the reference sleeve to the outside of the engine.

FIGURE 3 is a section on the line 3—3 of FIGURE 2.

FIGURE 3A is a section on line A—A of FIGURE 3.

FIGURE 3B is a diagrammatic showing of near minimum and near maximum torque indicating positions.

Figure 5:
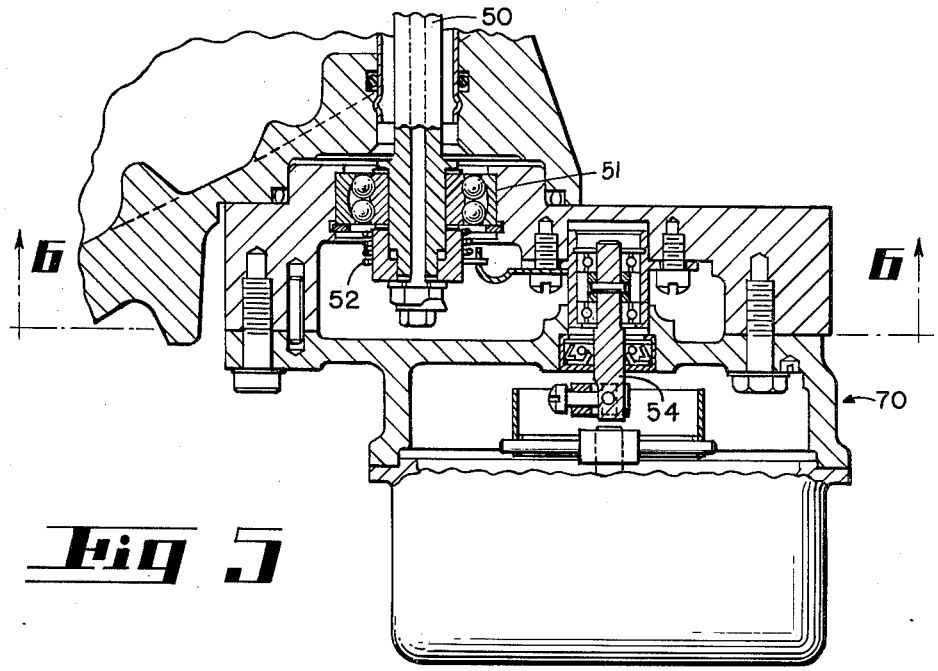
FIGURE 5 is a section on the line 5—5 of FIGURE 4.
Figure 4:
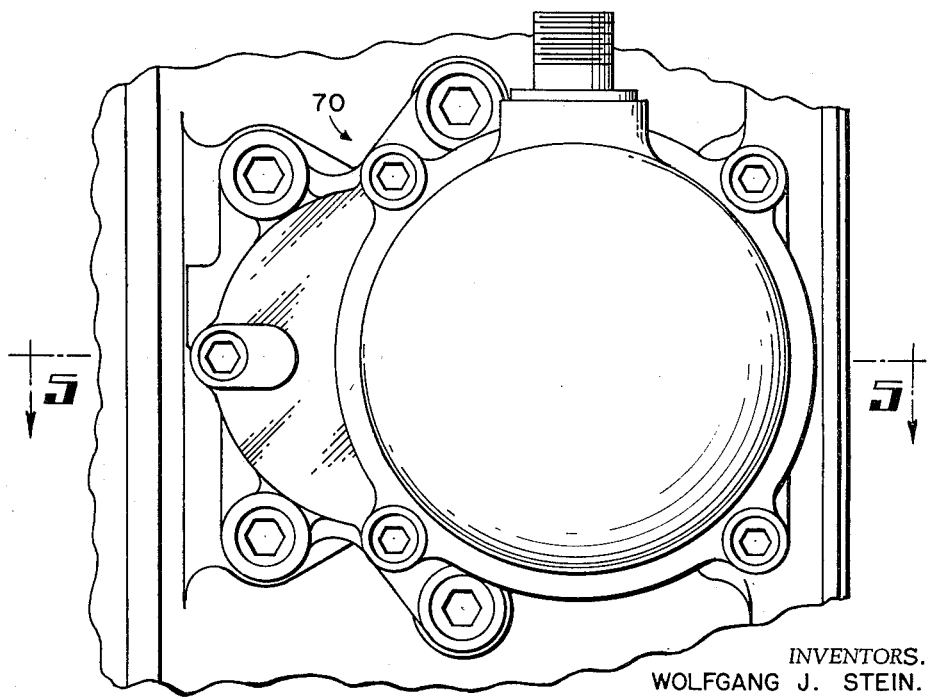
FIGURE 4 is a view of the outside of the housing, showing the means for housing the exterior portion of the deflection transmitting shaft at the outside of the engine.
Figure 7:
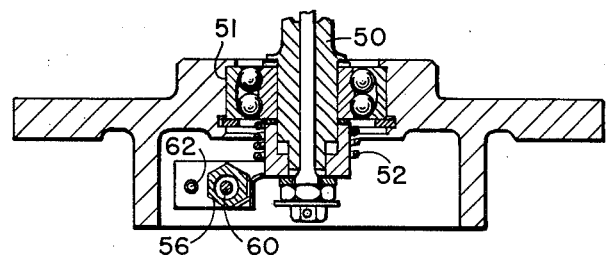
FIGURE 7 is a sectional view taken on the line 7—7 of FIGURE 6.
Figure 8:
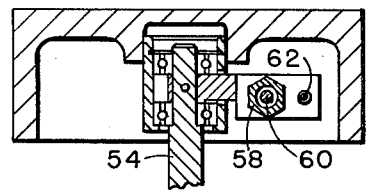
FIGURE 8 is a sectional view taken on the line 8—8 of FIGURE 6.

Referring to the drawings, and particularly to FIGURE 1, a shaft 10 is a part of the power transmitting section of a prime mover (here shown as the forward section of a gas turbine engine), shaft 10 being adjacent the gear reduction unit 12 and connects the gear reduction unit with the power shaft 14 driven by the power turbine of a gas turbine engine (not shown).

Shaft 10 is selected as the portion of the power transmitting mechanism which will normally deflect under torsion load during its rotation in direct proportion to the foot-pounds torque transmitted by the shaft. It is understood that the shaft 10 is in continuous rotation, and surrounding the shaft 10 there is provided a sleeve 16 with a connecting sleeve section 18. Both of these sleeves are mounted relative to the shaft section 10 so that they rotate with the shaft but are not subject to the torsion load imposed on the shaft. This mounting is accomplished by bosses 20, 22 and 24, which are circumferential projections from the shaft 10, which surfaces support the sleeves 16 and 18, but allow relative torsional movement between the shaft 10 and the sleeves 16 and 18.

The sleeve 16 is connected to the sleeve 18 by spline connection 26 so that the rotation but not axial movement relative to the sleeves 16 and 18 is transmitted therebetween. The sleeve 18 is limited in its axial travel by ring 28, and the two sleeves 16 and 18 are forced axially apart from each other by spring 30. The end 32 of sleeve 16 forms an annular contacting surface, and flange 34 on sleeve 18 likewise affords an annular contacting surface. The opposite end of the sleeve 16 is provided with three spaced contacting helical surfaces 36 which coact with mating helical surfaces 38 carried on ring 40, which is integral with and therefore subject to torsional deflection of the shaft 10.

The above-identified supporting mechanism affords a means to translate the torsional deflection of the shaft 10 during rotation of said shaft into axial movement of the sleeve 16 against the spring 30. In other words, assuming that the shaft 10, rotating with the engine and transmitting its torque, is in operation, the torsional deflection will cause relative rotational movement between the shaft 10 and sleeve 16; and, because of the sliding helical contact between the surfaces 36 and 38, there will be a sliding of this sleeve 16 in proportion to the magnitude of the torque transmitting, inasmuch as the sleeve 16 is a reference sleeve not subject to torque load and therefore the axial movement of the sleeve will be in proportion to the torsional deflection and therefore a function of the magnitude of the torque carried by the shaft 10.

Figure 6:
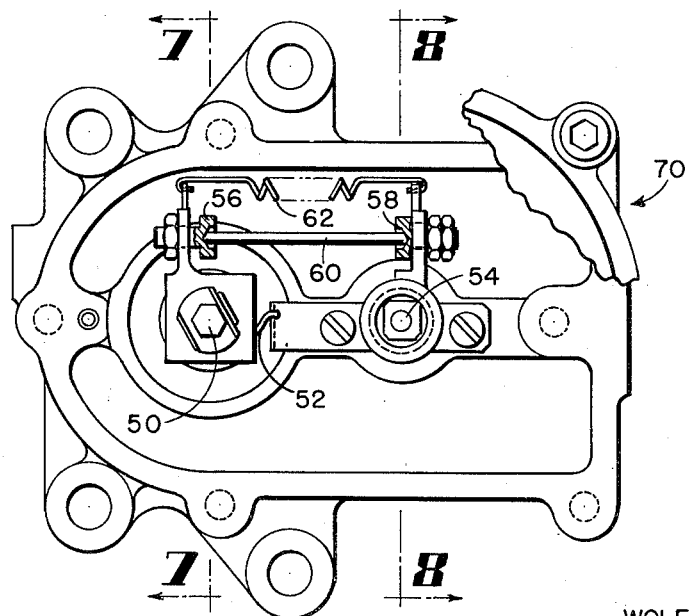
FIGURE 6 is a view taken on the line 6—6 of FIGURE 5.

The next problem in connection with the mechanism is to transmit this axial movement of the surface 32, which is in proportion to the torque transmitted by the shaft, to the outside of the engine so that it may be reflected on measuring instruments. This is accomplished by causing the rotating end surface 32 of reference sleeve 16 to contact a roller 44, which is shown in section in FIGURES 2, 3, and 3A. The roller 44, as will be apparent on inspection, contacts the rotating surface 32 and (as viewed in FIGURE 3) the position of the mounting 48 for the roller 44 is eccentric to the axis of the shaft 50 in the plane normal to the axis of the shaft 10 so that (as will appear on inspection of FIGURES 1, 2, 3, and 3A) the axial movement of the surface 32 against the spring 30 will cause a limited rotative movement of the shaft 50 with the eccentricity of the mounting 48 of the roller 44 acting as a crank to rotate the shaft 50, also in proportion to axial movement of sleeve 16 and the torque transmitted by the shaft 10. The crank lever arm F is shown on FIGURE 3A and is evident also on inspection of FIGURE 3. FIGURE 3B shows in a diagram, in dotted and dot-dash lines respectively, the near minimum and near maximum torque indicating positions. The shaft 50, as will appear on inspection of FIGURE 5, acts against a spring 52 and (as will appear in FIGURE 6) angular partial rotation of the shaft 50 against a spring 52 is transmitted to a shaft 54 spaced from and parallel thereto through a pair of abutments 56 and 58 (FIGURE 6) through a push rod 60 retained by spring 62 so that the aforesaid angular partial rotation of the shaft 50 is transmitted to the shaft 54, and therefore the angular movement of the shaft 54 is likewise a function of the torsional deflection of the shaft section 10 and a direct function of the torque transmitted by the shaft section 10.

It is noteworthy that the use of roller 44 contacting the axially movable surface 32, and the roller sleeve 46 contacting the rotating reference flange 34, with the eccentric mounting 48 relative to shaft 50 makes possible a transfer of the axial movement of surface 32 relative to reference 34 (a function of torque) to the outside of the engine through shafts 50 and 54. The location of the axis of roller 44 on a radial line from the center of shaft 10 (see FIGURE 3) avoids tendency of sliding contact between surface 32 and roller 44 as the contact is a circle concentric with the rotation of the surface 32.

As previously mentioned, the movement of the rotating axially moveable surface 32 relative to rotating reference flange 34 is an indication of torque; but because of varying temperatures, expansion and stress loads of the internal and external parts of the power plant, certain axial dislocations of the entire torque meter assembly, including the surfaces 32, 34 moving together as a unit, will occur. Such movement requires compensation to assure accuracy of the torque reading. This compensation is accomplished by providing freedom for the assembly with rollers 44, 46 and shaft 50 to follow the aforesaid axial movement. Such result is made possible by allowing the shaft 50 to tilt about spherical bearing 51. The bearing 53 is provided with a mounting which allows such limited movement in one plane only; i.e., the direction of axial movement aforesaid.

The shaft 54 is therefore partially rotated in amount as a direct function of the torque transmitted through the rotating shaft section 10. The magnitude of this deflection is calibrated in relation to the torque and is used as a measurement of torque by applying this movement to actuate a 28-volt electrical cycle signal from a synchro transmitter 70 to a cockpit instrument which is a synchro indicator calibrated to read directly in foot-pounds torque.

The details of the synchro transmitter 70 is not a part of this disclosure, but may be any mechanism known in the art to transmit movement from one location to anoher by electrical means. The important feature here disclosed is that by the mechanism shown the magnitude of torsional deflection of a rotating engine shaft is transmitted from the interior of the engine to the exterior of the engine in the form of an angular movement of a shaft such as 54 which is proportional to torque transmitted by the load-carrying engine shaft, such as shaft 10, thereby affording a mechanism for indicating torque.

It would be possible in this mechanism to provide an indicating instrument actuated directly by the shaft 54 which would be calibrated to read in foot-pounds torque, but it is usually desired and most practical to transfer the reading to another instrument.

In operation the sleeve sections 16 and 18 surrounding the torque transmitting shaft section 10 affords a reference as well as a means of translating the magnitude of the torsional deflection of the shaft section 10. This is accomplished since the end of the section 18 is secured to the shaft at one end only and the surrounding sections 16 and 18 extend around the shaft 10, without being secured positively thereto, to the opposite end where the contact is made with the helical surfaces 36 and 38. On inspection it will appear that if the torsional drive loading of shaft 10 is assumed in its length from the reference flange 34 to the helical surface 38, that the shaft 10 will deflect under load of torsion and will in effect twist relative to the reference sleeve 16 and the contacting helical surface 36 because of the fact that the sleeves 16 and 18 will not be under torsional stress and will therefore be relatively stationary. The effect will be a sliding of the helical surface 38 against the helical surface 36 which will cause the axial movement of the sleeve section 16 toward the right, as viewed in FIGURE 1, against the action of the spring 30 and as allowed by the spline connection 26, thus causing the annular end surface 32 of the sleeve section 16 to be moved axially relative to reference surface 34 which is contacted by roller 46. It is remembered that this indicating surface 32 transmits movement to the eccentrically mounted rotating roller 44 and thus imparts a proportional rotation to the shaft 50 which reflects the proportional axial movement of the sleeve 16, which is in turn proportional to the torsional deflection of the shaft 10 and therefore also proportional to the torque transmitted through the shaft 10. This partial rotational movement of the shaft 50 is, as previously described, transmitted finally to the angular movement of the shaft 54 through the members previously enumerated, with particular reference to FIGURE 6.

The invention has been described by specific reference to a mechanism of the type found practical in actual operation, and some variation in the type of mechanism is possible and contemplated within the principles herein disclosed. It is contemplated that the torsional deflection of other rotating members of a power plant or other prime mover may be used as an indication of torque, and the torsional deflection measured in relation to a surrounding sleeve or member according to the principles herein disclosed. It is therefore the intention that this invention may not be limited other than by the scope of the following claims.

We claim:

1. In a torque measuring mechanism of the character described employing torsional deflection of a torque transmitting member of a prime mover as a means of indicating torque, a reference member, a first section of said reference member secured to said torque transmitting member and rotating therewith, a second section of said reference member rotating with said first section but not connected to said torque transmitting member and thus not subject to torsional load of said torque transmitting member, said second section axially movable relative to said first section in a direction substantially parallel to the axis of rotation of said torque transmitting member, and resilient means for confining said movement, angular contacting means between said torque transmitting member and said second section of said reference member whereby the torsional deflection of said torque transmitting member is translated into axial movement of said second section of said reference member, said angular contacting means responsive to and indicative of torsional deflection of said torque transmitting member but not carrying the torsion load of said member, and means to translate said axial movement from said second section of said rotating reference member to a position remote from said reference member.

2. In a mechanism as in claim 1, wherein the means to translate said axial movement from said second section of said rotating reference member comprises a shaft positioned substantially at right angles to the longitudinal axial movement of said second section of said rotating reference member, and includes further means to translate said axial movement of said second section to limited rotation of said shaft positioned as aforesaid comprising a roller mounted eccentric to the axis of said translating shaft and contacting said axially movable second section of said reference member, said translating shaft being rotated by the crank action effected by the eccentricity of said roller from the axis of said translating shaft.

3. A torque measuring mechanism of the type employing a torsional deflection of a rotating shaft as a means of measuring torque, comprising a length of said shaft sufficient to provide a measurable torsional deflection proportional to torque, a sectional reference sleeve coaxial with said shaft and substantially surrounding said length of shaft with one end of said sleeve secured to said shaft to rotate said sleeve with said shaft, said sleeve extending to the opposite end of said shaft length and mounted with a freedom from torsional load of said shaft over said shaft length whereby difference in torsional deflection between said shaft and sleeve adjacent said opposite end is indicative of torque transmitted by said shaft, a first section of said sleeve extending from said secured end of said sleeve, a second section of said sleeve extending from a region intermediate said secured end of said sleeve and said opposite end of said shaft length, connecting means between said first and second sleeve sections allowing axial sliding movement of said second section relative to said first section but rotating said sections together with said shaft, connecting motion-translating means between said shaft and said sleeve adjacent said opposite end of said shaft length translating said difference in torsional deflection of said shaft and sleeve into axial movement of said second sleeve section, and means contacting said second sleeve section to transfer said axial movement from said second section of said reference sleeve to a position remote from said reference sleeve.

References Cited in the file of this patent

UNITED STATES PATENTS

| | | |
|---|---|---|
| 670,324 | Leverkus | Mar. 19, 1901 |
| 950,511 | Johnston | Mar. 1, 1910 |
| 1,204,292 | McCormick | Nov. 7, 1916 |
| 1,857,688 | Mackenzie | May 10, 1932 |
| 1,976,813 | Sykes | Oct. 16, 1934 |
| 2,700,896 | Root | Feb. 1, 1955 |